United States Patent
Hirumi et al.

(10) Patent No.: US 7,126,618 B2
(45) Date of Patent: Oct. 24, 2006

(54) APPARATUS AND METHOD FOR PRINTING IMAGE AND INFORMATION ASSOCIATED THEREWITH

(75) Inventors: Yasushi Hirumi, Kanagawa (JP); Shinichi Horii, Kanagawa (JP)

(73) Assignee: Sony Corporation, Tokyo (JP)

( * ) Notice: Subject to any disclaimer, the term of this patent is extended or adjusted under 35 U.S.C. 154(b) by 896 days.

(21) Appl. No.: 10/080,246

(22) Filed: Feb. 21, 2002

(65) Prior Publication Data

US 2002/0118377 A1   Aug. 29, 2002

(30) Foreign Application Priority Data

Feb. 22, 2001   (JP)   ............................ P2001-046407

(51) Int. Cl.
   *B41J 2/325*   (2006.01)
(52) U.S. Cl. ....................................................... 347/171
(58) Field of Classification Search ................ 347/171; 400/120.01
   See application file for complete search history.

(56) References Cited

U.S. PATENT DOCUMENTS

| | | | |
|---|---|---|---|
| 5,458,713 A | 10/1995 | Ojster | |
| 5,550,624 A | 8/1996 | Wachtler | |
| 5,689,326 A | 11/1997 | Yamada | |
| 6,128,038 A | 10/2000 | Nakajima | |
| 6,164,849 A | 12/2000 | Koyama | |
| 6,382,852 B1* | 5/2002 | Koyama | 400/120.02 |

FOREIGN PATENT DOCUMENTS

| | | |
|---|---|---|
| EP | 0958143 | 11/1999 |
| JP | 07-052428 | * 2/1995 |

* cited by examiner

*Primary Examiner*—Huan Tran
(74) *Attorney, Agent, or Firm*—Sonnenschein Nath & Rosenthal LLP

(57) ABSTRACT

A printing apparatus forms image information and information associated therewith on a print medium. The printing apparatus receives image information from an image file stored in a recording medium, etc., and obtains information associated with the image information. The associated information includes attached information that is read out from the image file based on a file format using tags via an interface unit or added information that is input or selected in accordance with the image information. The image information is printed on the print medium, and the associated information is formed on a film sheet (laminate film), which is disposed over the image-printed surface, as a watermark. The associated information is not visible when the print medium is seen from the front, and can be seen when it is seen at an angle due to the difference in surface glossiness.

12 Claims, 5 Drawing Sheets

APPARATUS AND METHOD FOR PRINTING IMAGE AND INFORMATION ASSOCIATED THEREWITH

RELATED APPLICATION DATA

The present application claims priority to Japanese Application(s) No(s). P2001-046407 filed Feb. 22, 2001, which application(s) is/are incorporated herein by reference to the extent permitted by law.

BACKGROUND OF THE INVENTION

1. Field of the Invention

The present invention relates to a technique for printing information associated with a printed image such as date, etc., without degrading the appearance of the image.

2. Description of the Related Art

In photographic records, date information which indicates the date on which a photograph was taken is often important, and sometimes, even valuable. Many cameras using silver salt film have a date function (date impose function), and, when an object is photographed, a date is imposed on the object image in the same frame during the exposure, so that a photograph in which the date overlaps the object image can be obtained. However, since characters representing the date are imposed on the printed image after the development, the appearance of the photograph is significantly degraded.

Due to the development of digital cameras, it has become possible to record and store image information along with associated information such as dates, conditions, names of image files, etc., with a common, standard format. For example, Exchangeable Image Format (Exif), which is common to various manufacturers, defines the kinds of tags with which the information associated with image data is recorded.

When such associated information is printed on a margin outside an image-printing area, the date information, etc., can be printed without degrading the appearance of the image.

However, in known apparatuses, there are problems in printing the associated information such as the date information, etc., as described below.

That is, since the margin is necessary for printing the date information, the image-printing area must be reduced or print paper having a relatively large size must be used. In addition, since the information is printed on the margin outside the image, the area of the margin must be increased as the amount of information to be printed is increased. Accordingly, it may become impossible to print the image at the maximum allowable print size of the print paper.

In addition, in digital-image-data printing, there are requirements for margin-free printouts as there were in the conventional photograph printing using silver salt film. However, if characters, etc., are imposed on an image in order to satisfy such requirements without changing the paper size, the problems of the conventional photograph printing cannot be solved. More specifically, when the date information, etc., is printed along with an image, characters representing the information must be printed with vivid colors (for example, orange, yellow, etc.) at a predetermined position in the image-printing area so that they can be seen clearly. As a result, the appearance of the photograph is degraded.

When the margins, which are used for preventing the characters representing a date, etc., from being imposed on the image, cannot be provided, another way to avoid printing the characters on the image is to print them on the backside. However, in such a case, a double-side printing mechanism is required, so that the size of the apparatus is increased and mechanism and control thereof becomes complex. In addition, high costs are incurred and the printing time is increased.

SUMMARY OF THE INVENTION

Accordingly, an object of the present invention is to print information associated with a printed image such as a date, etc., without degrading the appearance of the image or using a dedicated margin.

According to one aspect of the present invention, a printing apparatus includes an information-obtaining unit which receives the image information and obtains the information associated therewith, the associated information including attached information that is read out in relation to the image information or added information that is input or selected by an input/operation unit in accordance with the image information; a printing unit which includes a transfer head which forms the image information on the print medium and which transfers a film sheet onto the image-printed surface of the print medium; and a control unit which controls energy applied to the transfer head and changes a property (for example, glossiness) of the film sheet, thereby forming the associated information on the film sheet as a watermark.

In addition, according to another aspect of the present invention, a printing method includes the steps of receiving the image information and obtaining the information associated therewith, the associated information including attached information that is read out in relation to the image information or added information that is input or selected by input/operation means in accordance with the image information; printing the image information on the print medium; and covering the image-printed surface of the print medium with a film sheet and forming the associated information on the film sheet as a watermark.

Accordingly, the associated information such as date information, etc., can be formed on the film sheet as a watermark. More specifically, the associated information is not visible when a print paper is seen from the front, but can be seen when the print paper is seen at an angle due to the difference in surface glossiness. Thus, the associated information can be formed without providing a dedicated margin or performing backside printing. In addition, since the associated information does not block the printed image, the appearance of the image is not degraded.

According to the present invention, the following advantages can be obtained:

Tag information, that is, information stored in Exif files with reference to tags (for example, dates, conditions, names of files, comments of users, copyright display information, etc.), can be formed on the printed image. Since the characters and signals representing the tag information can be formed as a watermark, they are not visible when the a print paper is seen from the front, and can be seen clearly only when the print paper is seen at an angle. Accordingly, the printed image is not degraded and the appearance thereof is ensured.

The position and orientation of the characters representing the associated information can be selected in accordance with the orientation of the image. Accordingly, the appearance of the associated information can be improved.

A requirement to form a watermark on a copyrighted image and a requirement of a creator of the image to make his or her work look as attractive as possible can be satisfied at the same time.

At photographic services (development, printing, enlargement, etc.), business advertisements can be formed on a laminate layer (film layer) as a watermark. Accordingly, the present invention can be applied generally. In addition, advertising revenue can be expected, so that the printing costs can be reduced.

In addition to the characters and figures, bar code information, etc., can also be formed on the laminate layer. Accordingly, the images can be more conveniently handled in view of management, storage, selling, etc.

When a copy machine containing a sensor which is able to detect difference in glossiness from the angle at which the peripheral light is completely reflected, the image can be prevented from being copied.

BRIEF DESCRIPTION OF THE DRAWINGS

FIG. 6 shows an example of the landscape orientation and FIG. 7 shows an example of the portrait orientation.

DESCRIPTION OF THE PREFERRED EMBODIMENT

The present invention relates to a printing apparatus which prints image information and information associated therewith on a print medium. The present invention may be carried out in, for example, the following two modes:

(A) A mode in which the image information and the associated information are processed by a calculating unit such as a computer, etc., and the result is output to a printing unit such as a printer, etc., and is printed out; and (B) A mode in which the processing of the image information and the associated information and the printing process are performed by a printer or an apparatus such as a camera, etc., having a printing function.

In a system according to Mode (A), the image information is obtained from a recording medium, via a communication line, etc., or is created by an operator, and the calculating unit is used for decompressing an image pattern, obtaining the associated information, and performing input/select process, editing process, etc. For example, when the associated information such as date, etc., is handled in the form of an ASCII character string, it must be converted into bitmap data on the basis of certain font information. In this system, there is an advantage in that such a process can be easily performed with an application software on a computer by using a function provided by an operating system (OS).

In Mode (B), both the information processing function and the printing function must be provided to a single apparatus. Since the apparatus is able to perform all the processes that are necessary, it can be suitably applied as a portable apparatus. In addition, since a complex operation using a keyboard, etc., is not necessary, the apparatus can be used easily and handily.

According to the present invention, various types print media including print paper, cards (for example, ID cards to which pictures for identification are attached), sheets (for example, sheets of barcode tags), etc., may be used in accordance with the application.

Figure 1:
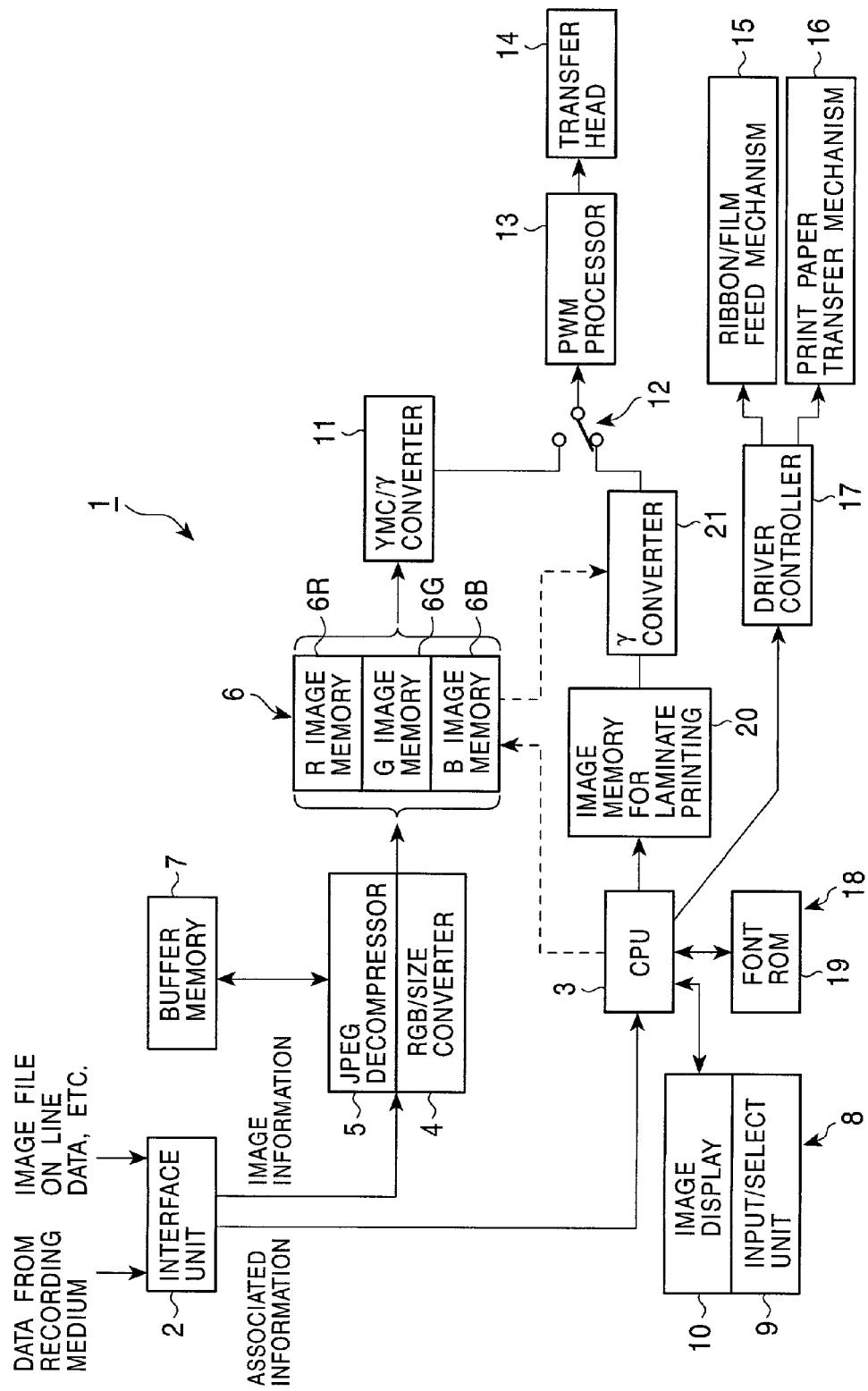
FIG. 1 is a circuit block diagram showing a construction of a printing apparatus according to the present invention.

FIG. 1 is a block diagram showing a major part of a circuit construction in a printing apparatus according to an embodiment of the present invention. Although a sublimation thermal transfer printer will be explained below as an example of a printing apparatus, the present invention may of course be applied to various types of apparatuses using other print methods.

With reference to FIG. 1, a printing apparatus 1 includes an interface unit 2 for obtaining image information, and receives, for example, data read out from a recording medium or obtained by on-line processing via communication lines. The recording medium may be a magnetic disk, optical disk, a detachable memory medium (for example, card-shaped or stick-shaped semiconductor memory) with which data can be exchanged between a plurality of apparatuses under a common standard, etc. Although an information reproducing unit, a memory control circuit, etc., are necessary for reading out the information from the recording medium, it is assumed herein that they are included in the interface unit 2 in FIG. 1.

The thus obtained image information is transferred to a Central Processing Unit (CPU) 3, an RGB/size converter 4, and a Joint Photographic coding Experts Group (JPEG) decompressor 5 via predetermined signal lines.

When the image information is not compressed, it is processed by the RGB/color converter 4, and red (R), green (G), and blue (B) image data in which the image size is adjusted to a print size are stored in an image memory 6. The image memory 6 serves as an image storage unit and includes image memory blocks 6R, 6G, and 6B corresponding to red, green, and blue colors, respectively. When the image information is compressed, it is first decompressed by the JPEG decompressor 5 so that brightness data (Y) and color difference data (Cb and Cr) are obtained. Then, the thus obtained data are subjected to the size/RGB conversion process, and are transferred to the image memory 6. A buffer memory 7 is used as a working area for the image conversion process and the decompressing process performed by the RGB/size converter 4 and the JPEG decompressor 5.

The printing apparatus 1 according to the present embodiment has a function to print information associated with the image information. In the descriptions herein, "associated information" includes, for example, the following information:

(I) attached information which is read out in relation to the image information;

(II) added information which is input or selected by an operator in accordance with the image information.

The attached information (I) includes information that is incorporated in a file-format standard (Exif, etc.) as information relevant to the image information, for example, date information (date on which a photograph is taken, date on which image information is created, etc.), copyright display information, etc.

Figure 2:
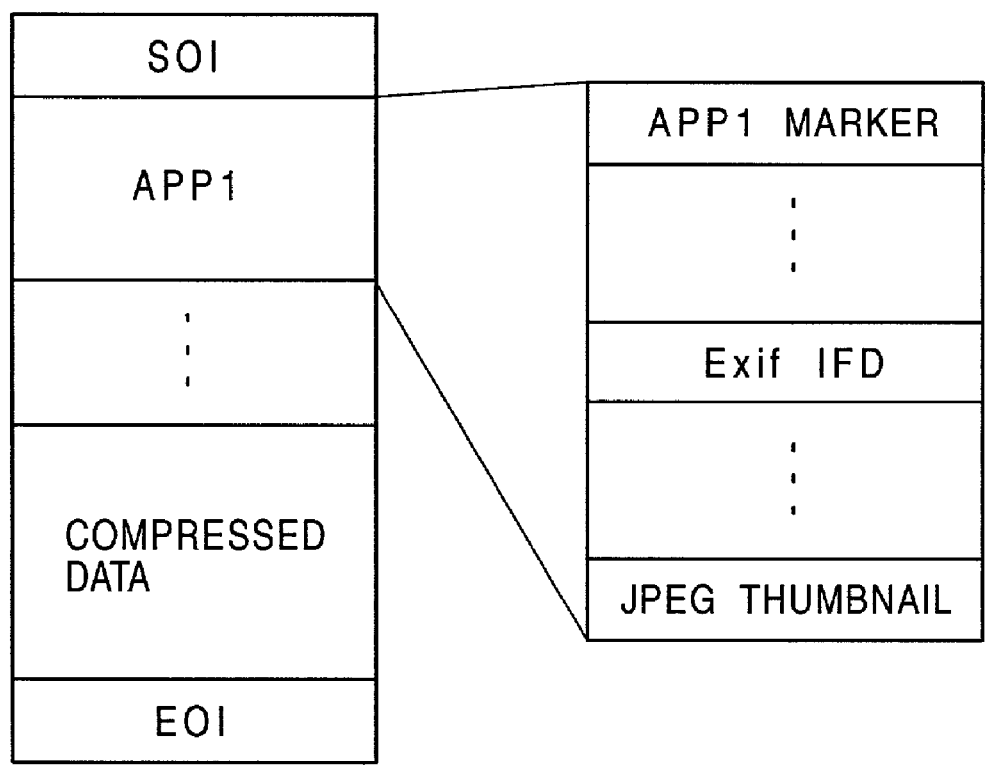
FIG. 2 is a schematic diagram showing a file structure.

With reference to FIG. 2, a case will be described in which image information and information associated therewith are obtained from an image file based on a file-format standard including the associated information as tag information. The "tag information" refers to data available with reference to tags, that is, identifiers for data fields to each of which a unique number is assigned.

FIG. 2 is a schematic diagram showing a file structure of a compressed Exif file having a compressed thumbnail image.

At the left side in FIG. 2, "SOI" is a marker which shows the position where the file starts, and "APP1", which is an application marker segment, is recorded after "SOI". Compressed data is recorded after various kinds of tables and headers (not shown), and "EOI", which is a marker which shows the end of the data, is recorded at the end.

The "APP1" includes a marker, "Exif IFD" which contains attached information based on Exif, a compressed thumbnail image based on JPEG, etc. The "Exif IFD" includes the above-described tags (Exif Private Tag), types (types of data such as ASCII, bite-type, long-type, etc., indicated by numbers assigned thereto), count (the number of values), etc.

For example, tags corresponding to data relating to date include the following:

"DateTimeOriginal", which indicates the date and time at which the original image data is generated. In the case of a camera, this date is the date and time at which a picture is taken. Tag number is "9003H" in hexadecimal number.

"DateTimeDigitized", which indicates the date and time at which the image is digitalized. In the case in which a file is created at the same time a picture is taken by a camera, this data is the same as the "DateTimeOriginal". Tag number is "9004H" in hexadecimal number Both of the above-described data are of the ASCII type, and the length of the character string is 20 bytes including NULL characters.

Tags relating to the structure of the image data include a tag which indicates the orientation of the image (the tag number is "112H" in hexadecimal number), and numbers are individually assigned to orientations (or configurations) of the image.

In addition, information for displaying copyright or a copyright holder (for example, a person who took the picture, edited the image, etc.), a title of the image, a name of the image file, comments of the user, conditions under which the picture was taken, characteristics of the image data, version information, etc., are defined in correspondence with tag numbers.

Although non-compressed data files have a structure different from the compressed data files, the part of the "Exif IFD", which is recorded after "0th IFD", is basically the same as described above, and explanations thereof are thus omitted.

Accordingly, the attached information (I) has various desirable characteristics in that the information relating to the image can be recorded in correspondence with predetermined tags and the recorded information can be easily used. In addition, the format standard has high versatility and upward compatibility.

The added information (II) is useful when a user wishes to input or select data and add the data to the image information. For example, the added information (II) includes information which is input by the user by using an input unit or an operation unit of the printing apparatus, the information relating to the image data (comments of the user, etc.). In addition, the added information (II) also includes information which is selected by the user from lists of information by using the operation unit, the lists of information being stored beforehand in a storage unit (ROM, etc.) of the printing apparatus, read out therefrom, and shown on a display. Since the operation to input the information is more complex then the operation to select the information, the operational mode is preferably designed in accordance with the application and the usage of the printing apparatus.

Accordingly, the associated information includes all the information that is to be recorded in relation to the image information, such as, information that the person who took the picture or created the image wishes to print with the image, information that is to be printed with the image for other purposes, etc.

When the associated information is the attached information (I), it is input to the CPU 3 via the interface unit 2 and is processed. When the associated information is the added information (II), it is input to the CPU 3 by an input/operation unit 8 and is processed. The input/operation unit 8 includes an input/select unit 9 (an operation panel, a keyboard, a pointing device, etc.) and an image display 10 (a liquid crystal display, a CRT, etc.) used for displaying the image, command, etc., are provided as a human-machine interface. The input/select unit 9 is also used for inputting, or selecting, the information indicating the orientation of the image, the information being necessary for determining the position and orientation in which the associated information is to be printed in accordance with the printing direction of the image (these processes will be described below).

Accordingly, an information obtaining unit (or an information acquisition unit) is constructed of the interface unit 2 and the input/operation unit 8. As described above, the interface unit 2 is used for obtaining the image information and the attached information which is read in relation to the image information, and the input/operation unit 8 is used for obtaining the added information which is input or selected by the user.

The printing apparatus according to the present embodiment includes a system for printing the image information and a system for printing the associated information. First, the system for printing the image information will be described.

The image information for a single frame stored in the RGB image memory 6 is read out and is transferred to a YMC/γ converter 11, where conversion from primary color system to complimentary color system (yellow (Y), magenta (M) and cyan (C)) and γ conversion are performed, and is then transferred to the switch 12.

During the process of printing the image information, the output data from the YMC/γ converter 11 is selected by the switch 12 and is transmitted to a transfer head 14 via a pulse wave modulation (PWM) processor 13. In the present embodiment, the transfer head 14 is a thermal head which serves as a print head for printing the image information on the print medium. A printing unit is constructed of a printing/surface coating cartridge (ribbon cartridge), which is provided with color ink and a film sheet (transparent laminate film, etc.), a feed mechanism 15 for the cartridge, a print paper (photographic paper) transfer mechanism 16 for feeding, outputting, and transferring the paper, and a driver controller 17 (which is controlled by the CPU 3) for each mechanism. When the image is printed, the print paper is transferred by the transfer mechanism 16 and is subjected to a thermal transfer process using Y, M, and C ink ribbons, in that order, so that the image is printed thereon. Then, a film sheet is disposed over the surface of the printed image and is transferred thereon by the transfer head 14, so that the surface of the printed image is protected. Although a printing process for black (K) is not performed in the present embodiment, this process may also be performed in accordance with requirements.

Next, the system for printing the associated information will be described below. The associated information is formed on the above-described film sheet as a watermark.

In order to print the associated information obtained by the above-described information-obtaining unit, the CPU 3 is connected to a font Read Only Memory (ROM) 19, which serves as a data storage unit 18. The data storage unit 18 stores font data, which is necessary for forming characters or symbols representing the associated information on the film sheet, or information necessary for generating the font data.

The associated information, which is to be printed on the laminate film, is converted into bitmap data by referring to the data stored in the font ROM 19 under the control of the CPU 3. Then, the obtained bitmap data is transferred to an image memory 20 for laminate printing and stored in the image memory 20. In the present embodiment, the image memory 20 has a data capacity corresponding to a single frame.

When the associated information is formed by laminate printing, the information stored in the image memory 20 is read out, processed at a γ-converter 21, and transferred to the switch 12.

Figure 3:
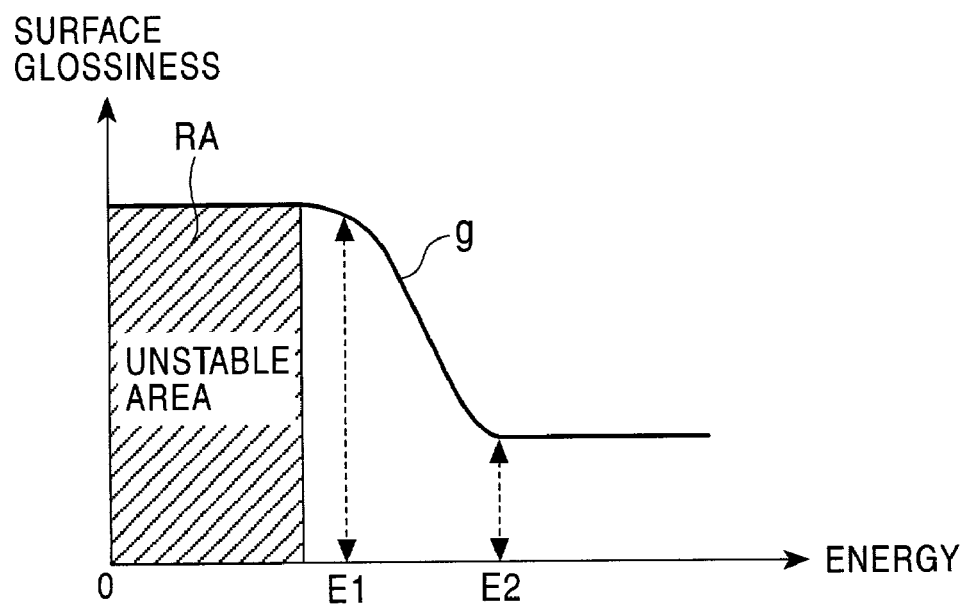
FIG. 3 is a graph showing the relationship between energy applied to the transfer head and surface glossiness.

FIG. 3 is a graph which schematically shows the printing characteristics in the process of transferring the laminate film. The horizontal axis shows energy applied to the transfer head, and the vertical axis shows surface glossiness (indicated by, for example, 0 to 100%). In FIG. 3, the shaded area RA shows an area where the transfer is unstable.

The laminate film is transferred on the image-formed surface of the photographic paper by the fusion thermal transfer technique. As shown in FIG. 3, when the laminate film is transferred while the energy applied to the transfer head is changed, the surface glossiness of the laminate film changes along with the applied energy in the area where the transfer process can be reliably performed (in the area outside the unstable area RA) as shown by the curve g. With reference to the curve g, the surface glossiness is approximately constant until the energy reaches E1, but suddenly falls when the energy exceeds E1. Then, when the energy is further increased, the surface glossiness stops falling after the energy reaches E2. Thus, E1 indicates the energy below which the surface glossiness can be ensured, and E2 indicates the energy above which the surface becomes matt. Accordingly, the energy is set to E2 (or to a value close to E2) for regions corresponding to the bitmap data stored in the image memory 20, and is set to E1 (or to a value close to E1) for other regions. According to this process, which is referred to as γ conversion (for example, a data-reference type conversion using a one-dimensional look-up table), the associated information can be formed on the printed image as a watermark.

An experiment was performed in which the energy applied to each of 300 Dot Per Inch (DPI) heaters was changed in sixteen steps. A constant electrifying time interval for a single step was determined, and the energy was increased from Step 1 to Step 16 by increasing the total electrifying time intervals. Then, the glossiness of the obtained surface was determined. As a result, the area in which the transfer process was reliably performed was from step 9 to step 16 (the surface glossiness in this area was 60% to 90%), and the glossiness started to fall along with the increase of the energy at step 14.

E1 changes in accordance with various conditions such as the characteristics of the film and the transfer head that are used, etc. However, when E1 is defined as the maximum value for a reliable transfer process, it can be assumed that the surface glossiness falls in a range from approximately 1.2 times E1 to 2 times E1. Accordingly, E2 is preferably set to the maximum value in this range or to a value close to the maximum value. When E2 is too close to E1, visibility of the associated information, which is formed as a watermark, is degraded, and when E2 is too high, problems of energy loss and excess heating rise. Preferably, E2 is set to an adequate value in consideration with the above-described factors.

The energy applied to the transfer head for transferring the film sheet can be controlled by selecting from a plurality of control values which are set stepwise. Although E1 and E2 shown in FIG. 3 are used as control values in the present embodiment, more than three control values may also be set. From the viewpoint of easy control, the associated information is preferably formed as a watermark in the film sheet by making glossy regions and matt regions, or by changing the glossiness.

Figure 4:
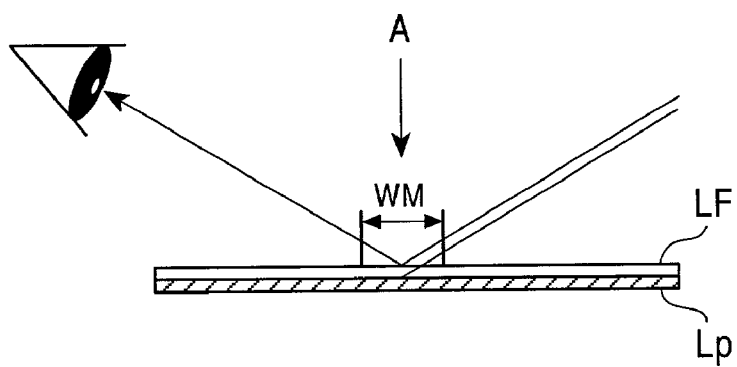
FIG. 4 is a diagram showing the visibility of a region where a watermark is formed.

The γ converter 21 performs the above-described processes. After the image has been printed, the data processed by the γ converter 21 (data of the associated information) is selected by the switch 12 and transferred to the PWM processor 13. Then, the transfer head 14 receives the output from the PWM processor 13 as a drive signal, and performs laminate printing. As shown in FIG. 4, the associated information is formed in a film layer LF covering a printed-image layer Lp merely by the difference in surface glossiness (the region indicated by WM shows the region where the characters, etc., are formed as a watermark). Accordingly, the associated information is not visible when the photographic paper is seen from the front, that is, from the direction perpendicular to the photographic paper (the direction shown by the arrow A), and is most clearly seen from the angle at which the peripheral light is completely reflected at the surface of the paper.

Accordingly, in the present embodiment, a control unit is constructed of the CPU 3, the image memory 20 for laminate printing, the data storage unit 18, the γ-converter 21, and the PWM processor 13. The control unit controls the energy applied to the transfer head 14 and changes the surface glossiness of the film sheet, and thereby forms the characters, symbols, etc., representing the associated information as a watermark.

In the present embodiment, the characters representing the associated information are formed on the film sheet by reducing the surface glossiness of the film sheet at regions corresponding thereto (regions where the associated information is formed). However, the characters may also be formed in a converse manner, that is, the regions outside the associated information may be formed as matt regions by setting the energy to E2 and the region corresponding to the associated information may be formed as glossy regions by setting the energy to E1. In addition, according to the present embodiment, the characters are formed as a watermark by changing the surface glossiness of the film sheet. However, properties other than the surface glossiness of the film sheet may also be changed as long as the watermark can be formed by changing the energy applied.

In addition, the image memory 20 dedicated for laminate printing is provided in the present embodiment. However, preferably, the storage unit for storing the image information is used, so that the storage capacity thereof can be exploited more efficiently. For example, since the image memory 6 is provided as a storage unit for the image information, a part of, or all of the memory area in the image memory 6 can also be used for storing the associated information. More specifically, after the data stored in the image memory blocks (6R, 6G, and 6B) has been output for printing the image, unused memory areas in the image memory blocks (6R, 6G, and 6B) can be temporarily used as an image memory for laminate printing. In such a case, as shown by the dashed lines in FIG. 1, the bitmap data for forming the associated information is transferred from the CPU 3 to the image memory 6, and temporarily stored in a predetermined area of the image memory 6. Then, the data is read out from the image memory 6 and transferred to the γ converter 21. Alternatively, the buffer memory 7 may also be used as the image memory for laminate printing, or the data of the associated information may be temporarily stored outside in a recording medium and read out therefrom when the laminate printing process is performed.

Next, image processing and associated information processing in the printing apparatus will be described below. In the following descriptions, a case is considered in which the image file is JPEG compressed and the above-described Exif date information is printed by laminate printing as the associated information.

When a thumbnail image is included in the image file data, an array of small images can be displayed on the image display 10 under the command of the CPU 3, so that the user can select the image he or she wishes to print. Alternatively, when a file format (for example, "DPOF" (trademark of Canon Kabushiki Kaisha)) of the image to be printed is determined in advance, the CPU 3 checks the contents of the image file and determines whether or not the image information is to be printed. Of course, the user may directly select the file and determine the image to be printed (for example, stationary images may be shown in turn and the user may issue a selecting command when the image that the user wishes to print is on the display).

In addition to the operation of selecting the image to be printed out, a command indicating whether or not the associated information is to be printed in the form of a watermark may be issued to the CPU 3 via the input/operation unit 8. In the following descriptions, it is assumed that the command to print the associated information has been issued.

In the process of decompressing the JPEG compressed image data, the CPU 3 issues a command to the JPEG decompressor 5 in units of pixel blocks, so that the brightness data (Y) and color difference data (Cb and Cr) are obtained. Then, the obtained data are temporarily stored in the buffer memory 7, and are then subjected to the size conversion (resizing process) process and the color conversion process, so that the RGB bitmap image data are obtained. Then, the RGB bitmap image data are stored in the memory blocks 6R, 6G, and 6B of the image memory 6 in accordance with the color.

The date/time information can be obtained from the Exif standard image file. As described above, the date/time information is stored in the "Exif IFD" (Exif Private Tag) as 20-byte ASCII character strings in correspondence with tag numbers 9003H and 90004H. Thus, the character string for the desired date/time information can be obtained by searching for the corresponding tag number, and the bitmap data for the obtained character string is determined by referring to the font ROM 19 and stored in the image memory 20 for laminate printing. If the tag cannot be found, or if the character string representing a date is not stored in correspondence with the tag, a process determined for such a situation is performed. For example, a message to inform the user that there is no date information may be displayed, or the user may be prompted to input the date information.

A case is considered in which a memory dedicated for laminate printing is prepared in addition to the image memory, and the memory for laminate printing has a memory area (virtual two-dimensional address area) corresponding to the pixel array of the print image. In such a case, as shown in FIG. 5, the associated information (date information) can be printed at a desired position.

Figure 5:
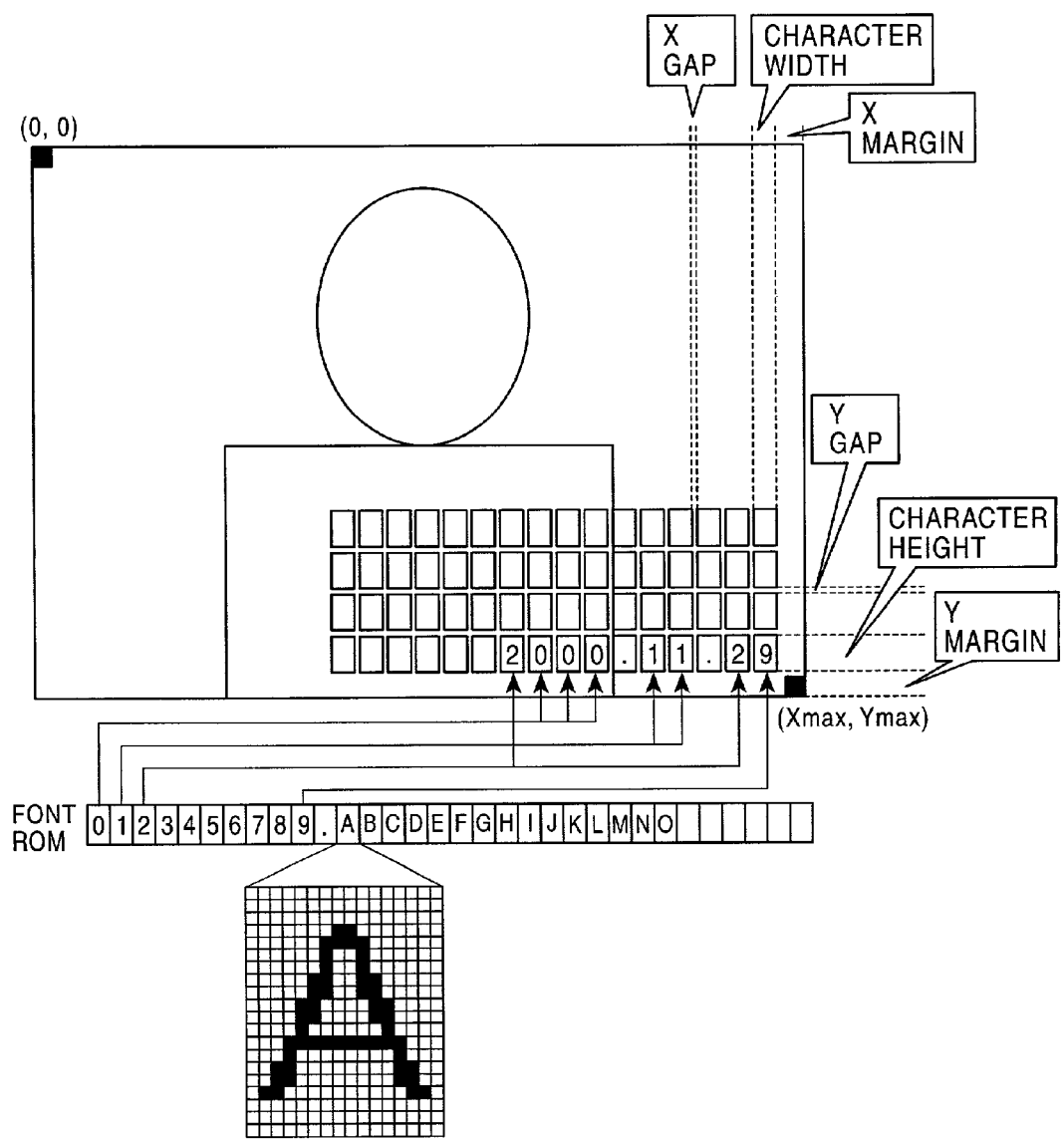
FIG. 5 is a diagram showing an example of a character string representing information associated with an image.

FIG. 5 is a conceptual diagram showing a memory structure in a case in which the date information is printed at the lower right position in the print image. In this example, it is assumed that the margin-free printout is performed.

In the coordinate system in which the upper left corner of the image is the origin (0,0) and X and Y directions are the horizontal and vertical directions, respectively, the coordinates of the lower right corner (Xmax, Ymax) are determined in accordance with the size of the print image.

The coordinates at which characters of the character string representing the date information are printed can be determined on the basis of margins in the X and Y directions (note that these margins are set for defining the printing positions and are not the above-described margins meaning the areas for printing the associated information thereon), the size of the characters, and gaps between the characters.

In addition, when the bitmap font stored in the font ROM 19 is used, the heights and widths of the characters can be determined by setting a magnification. In FIG. 5, a part of the contents stored in the font ROM 19 and enlarged bitmap data for the character "A" are shown. Although fonts other than a bitmap font may also be used, when the associated information can be shown by using only simple figures such as numerals, letters, symbols, etc., the bitmap font is preferably used from the viewpoint of processing speed, cost, etc.

The date information may be printed at, for example, a position such that the character string is adjusted to the lower right end as shown in FIG. 5. In such a case, after the ASCII character string representing the date information has been obtained, the data to be transferred to the image memory 20 is made such that the bitmap font data is adjusted to the right end in the character frame (frame for positioning the characters). Alternatively, the user may determine the position to print the associated information or select the position from a plurality of choices. In addition, with regard to the form of the date, the construction may be such that whether the year is printed in Gregorian years or Japanese years, the order in which the year, month, day, and time are printed, etc., can be determined or selected.

In the process of printing the image, the RGB data stored in the image memory 6 are subjected to optimal color conversions, so that YMC data are obtained. In addition, electrical energy applied to resistive elements provided in the thermal transfer head 14 is controlled by performing pulse width modulation, so that gradations are represented. Accordingly, a print image in which intermediate tones are reproduced can be obtained. This control process is performed for each of the color inks supplied by the feed mechanism 15, and a full-color image is obtained by transferring the color ink on the photographic paper and forming images of three colors over one another.

The process of forming the date information in the laminate film is performed after the above-described image-forming process. In this process, the characters, etc., are formed as a watermark by changing the surface glossiness of the laminate film when the laminate film is fed by the feed mechanism 15 and transferred on the image. More specifically, a plurality of control values are set stepwise in advance, and the energy applied to the transfer head 14 for transferring the film sheet is controlled by selecting from the control values. The energy applied to the transfer head 14 is controlled such that the surface glossiness of the film sheet is made relatively low (or high) at regions corresponding to the associated information (characters representing the associate information).

Figure 6:
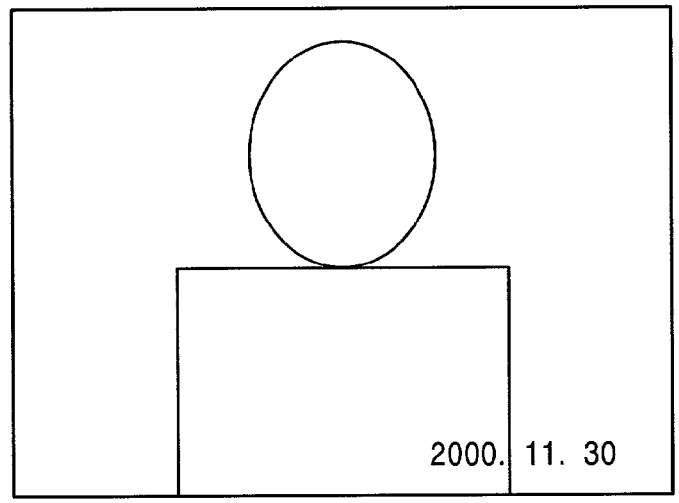
FIGS. 6 and 7 are diagrams showing manners in which the orientation and position of associated information are set in accordance with the orientation of an image, where
Figure 7:
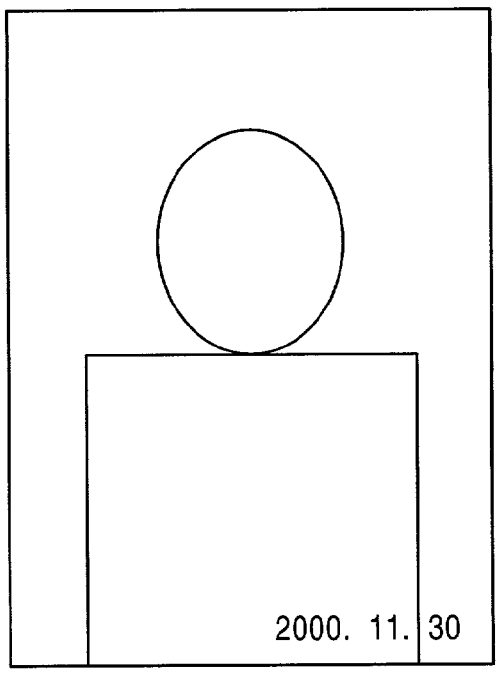

The position where the associated information is formed must be set in consideration with the orientation of the image. Otherwise, there is a risk that the watermark will be formed at unexpected or undesirable positions. For example, when a photograph is taken by a camera, a landscape-oriented image as shown in FIG. 6 is obtained if the camera is held in the horizontal position, and a portrait-oriented image as shown in FIG. 7 is obtained if the camera is held in the vertical position. Thus, landscape-oriented images and portrait-oriented images are stored in the same recording medium in a mixed manner. Accordingly, unless the position and orientation of the characters representing the associated information are set in accordance with the orientation of the image, there is a risk that the orientation of the image and that of the characters will be different and the characters cannot by seen easily.

In order to prevent such a situation, information regarding the orientation of the image is input or selected using the input/operation unit 8. Alternatively, the information regarding the orientation of the image is obtained from the attached information. Then, the position and orientation of the associated information is set in accordance with the orientation of the image. In the case in which the information regarding the orientation of the image is input or selected using the input/operation unit 8, the image is displayed on the image display 10. The user commands the rotation, vertical flip, etc., and determines the orientation of the image, and then the position and orientation of the character string representing the associated information are determined. Alternatively, the information regarding the orientation of the image can also be obtained from the attached information stored in "Exif IFD". As described above, the tag number "112H" is assigned for the orientation of the image, and the orientation of the image can be determined based on a number of the tag information (numbers 1 to 8 are used for representing eight kinds of orientations). Accordingly, in this case, the position and the orientation of the character string can be determined automatically.

In either case, the position and orientation of the character string representing the associated information such as date information, etc., are determined in accordance with the orientation of the image. Accordingly, the character string is formed along the longitudinal direction on a landscape-oriented image as shown in FIG. 6, and is formed along the direction perpendicular to the longitudinal direction (lateral direction) on a portrait-oriented image as shown in FIG. 7. In FIGS. 6 and 7, the character string which is formed as a watermark is shown as if it can be seen from the front of the image for convenience. However, in actuality, it cannot be seen unless the page is tilted and the character string is seen at an angle.

What is claimed is:

1. A printing apparatus which forms image information and information associated therewith on a print medium, the printing apparatus comprising:
   information-obtaining unit which receives the image information and obtains the information associated therewith, the associated information including attached information that is read out in relation to the image information or added information that is input or selected by input/operation unit in accordance with the image information; printer which includes a transfer head which forms the image information on the print medium and which transfers a film sheet onto the image-printed surface of the print medium; and control unit which controls energy applied to the transfer head and changes a property of the film sheet, thereby forming the associated information on the film sheet as a watermark,
   wherein, when information indicating the orientation of the image is input or selected, or when information indicating the orientation of the image that is included in the attached information is read out, the control unit determines the position and orientation in which the associated information is to be formed in accordance with the orientation of the image.

2. A printing apparatus according to claim 1 further comprising image storage unit which stores the image information, a storage area of the image storage unit being used also for storing the associated information.

3. A printing apparatus which forms image information and information associated therewith on a print medium, the printing apparatus comprising:
   information-obtaining unit which receives the image information and obtains the information associated therewith, the associated information including attached information that is read out in relation to the image information or added information that is input or selected by input/operation unit in accordance with the image information; printer which includes a transfer head which forms the image information on the print medium and which transfers a film sheet onto the image-printed surface of the print medium; and control unit which controls energy applied to the transfer head and changes a property of the film sheet, thereby forming the associated information on the film sheet as a watermark, and image storage unit which stores the image information, a storage area of the image storage unit being used also for storing the associated information.

4. A printing apparatus which forms image information and information associated therewith on a print medium, the printing apparatus comprising:
   information-obtaining unit which receives the image information and obtains the information associated therewith, the associated information including attached information that is read out in relation to the image information or added information that is input or selected by input/operation unit in accordance with the image information; printer which includes a transfer head which forms the image information on the print medium and which transfers a film sheet onto the image-printed surface of the print medium; and control unit which controls energy applied to the transfer head and changes a property of the film sheet, thereby forming the associated information on the film sheet as a watermark,
   wherein the image information and the information associated therewith are read out from an image file based on a format which includes the associated information as tag information, the image information being formed on the print medium and the associated information being formed on the film sheet as a watermark.

5. A printing apparatus according to claims 1 or 3, wherein the associated information includes at least one of date information indicating a date on which the image is photographed, a date on which the image is created, or a date on which the image information is processed, information indicating a name of an image file or a comment, and information for displaying copyright or a copyright holder, the associated information being obtained and formed on the film sheet.

6. A printing apparatus according to claim 1 or 3, wherein the image information and the information associated therewith are read out from an image file based on a format which includes the associated information as tag information, the image information being formed on the print medium and the associated information being formed on the film sheet as a watermark.

7. A printing apparatus according to claim 1, 3, or 4, wherein the control unit selects from a plurality of control values which are set stepwise in correspondence with the energy applied to the transfer head in the process of transferring the film sheet, and determines glossy regions and matt regions on the film sheet or changes the glossiness of the film sheet, thereby forming the associated information as a watermark.

8. A printing apparatus according to claim 1, 3, or 4 further comprising a data storage unit which stores font data for forming characters and symbols representing the associated information on the film sheet.

9. A printing method by which image information and information associated therewith are formed on a print medium, the printing method comprising the steps of: receiving the image information and obtaining the information associated therewith, the associated information including attached information that is read out in relation to the image information or added information that is input or selected by input/operation unit in accordance with the image information; printing the image information on the print medium; and covering the image-printed surface of the print medium with a film sheet and forming the associated information on the film sheet as a watermark,
  wherein the information associated with the image information is read out from an image file based on a format which includes the associated information as tag information.

10. A printing apparatus according to claim 9, wherein the associated information includes at least one of date information indicating a date on which the image is photographed, a date on which the image is created, or a date on which the image information is processed, information indicating a name of an image file or a comment, and information for displaying copyright or a copyright holder, the associated information being obtained and formed on the film sheet.

11. A printing apparatus according to claim 9, wherein a plurality of control values are set stepwise in correspondence with energy applied to a transfer head for transferring the film sheet, and, at the step of forming the associated information, the control values are selectively used in such a manner that surface glossiness of the film sheet is made relatively low at regions where the associated information is formed.

12. A printing apparatus according to claim 9, wherein a plurality of control values are set stepwise in correspondence with energy applied to a transfer head for transferring the film sheet, and, at the step of forming the associated information, the control values are selectively used in such a manner that surface glossiness of the film sheet is made relatively high at regions where the associated information is formed.

* * * * *